United States Patent
Tani et al.

(10) Patent No.: US 8,922,036 B2
(45) Date of Patent: Dec. 30, 2014

(54) VEHICULAR POWER GENERATION SYSTEM AND POWER GENERATION CONTROL METHOD FOR THE SAME

(71) Applicants: Hideaki Tani, Tokyo (JP); Toshiaki Date, Tokyo (JP); Satoshi Wachi, Tokyo (JP)

(72) Inventors: Hideaki Tani, Tokyo (JP); Toshiaki Date, Tokyo (JP); Satoshi Wachi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 37 days.

(21) Appl. No.: 13/653,874

(22) Filed: Oct. 17, 2012

(65) Prior Publication Data
US 2013/0307492 A1 Nov. 21, 2013

(30) Foreign Application Priority Data
May 21, 2012 (JP) ................................. 2012-115229

(51) Int. Cl.
F02D 29/06 (2006.01)
(52) U.S. Cl.
USPC ........................................ 290/40 C; 701/22
(58) Field of Classification Search
CPC ..... B60W 20/00; B60W 10/06; B60W 10/08; Y02T 10/6286; Y10S 903/902; B60K 6/48
See application file for complete search history.

(56) References Cited

U.S. PATENT DOCUMENTS

| 6,434,469 B1* | 8/2002 | Shimizu et al. .................. 701/84 |
| 6,480,767 B2* | 11/2002 | Yamaguchi et al. ............. 701/22 |
| 7,434,641 B2* | 10/2008 | Takami et al. ............. 180/65.25 |
| 7,460,947 B2* | 12/2008 | Yamashita et al. ............ 701/109 |
| 8,170,764 B2* | 5/2012 | Kaminsky et al. ............... 701/70 |
| 8,511,408 B2* | 8/2013 | Iwase et al. ............. 180/65.285 |
| 2008/0319595 A1* | 12/2008 | Yamamoto et al. ............. 701/22 |
| 2013/0210575 A1* | 8/2013 | Kumazaki et al. .............. 477/20 |

FOREIGN PATENT DOCUMENTS

JP 4158615 B2 10/2008

* cited by examiner

Primary Examiner — Michael Zarroli
(74) Attorney, Agent, or Firm — Sughrue Mion, PLLC; Richard C. Turner

(57) ABSTRACT

A vehicular power generation system includes: a battery which is charged by power generation electric power of a generator that is driven by an internal combustion engine; and a power generation control device which reduces the amount of fuel to be consumed for power generation of the internal combustion engine. The power generation control device includes: a unit which sets an operating range that is small in the amount of fuel to be consumed for an increase in torque of the internal combustion engine; a unit which sets electric power with high power generation efficiency to a target value of power generation electric power according to rotation speed and power generation voltage of the generator; and a unit which controls so that the amount of power generation of the generator is a target value when the operating point of the internal combustion engine is in the operating range.

11 Claims, 4 Drawing Sheets

VEHICULAR POWER GENERATION SYSTEM AND POWER GENERATION CONTROL METHOD FOR THE SAME

BACKGROUND OF THE INVENTION

1. Field of the Invention

The present invention relates to vehicular power generation systems and power generation control methods for the same and, more particularly, relates to a reduction in the amount of fuel to be consumed for power generation of an internal combustion engine.

2. Description of the Related Art

Conventionally, a generator is installed on a vehicle to supply electric power for various types of electrical loads and to charge a battery. Since the generator is driven by an internal combustion engine to perform power generation, fuel is consumed also for the power generation while the internal combustion engine operates.

On the other hand, in recent years, an improvement of fuel consumption of a vehicle is desired because of environmental problem and a method for reducing the amount of fuel to be consumed for power generation is proposed (for example, see Patent Document 1).

This prior art is configured to reduce the amount of fuel to be consumed for power generation by performing power generation in an operating range of an internal combustion engine, the operating range being small in the amount of fuel consumption, based on a map of the amount of fuel consumption to which an increase in the amount of fuel consumption with an increase in power of the internal combustion engine due to the power generation is added.

PATENT DOCUMENT

[Patent Document 1] Japanese Examined Patent Publication No. 4158615

However, in the prior art disclosed in Patent Document 1, the amount of fuel to be consumed for power generation does not consider efficiency of a generator (the ratio of electric power outputted by the generator to work that drives the generator) and driving time of the generator. For this reason, the amount of much work is needed to obtain the same electric energy in the case of the generator with low efficiency as compared to that with high efficiency; and thus, it is concerned that the amount of fuel to be consumed for power generation increases.

BRIEF SUMMARY OF THE INVENTION

The present invention has been made to solve the known problem described above, and an object of the present invention is to provide a vehicular power generation system and a power generation control method for the vehicular power generation system, which are capable of reducing the amount of fuel consumption per electric energy due to power generation of an internal combustion engine in operation by taking into account not only an operating range of the internal combustion engine performing power generation but also efficiency of a generator.

According to the present invention, there is provided a vehicular power generation system including: a generator which is driven by an internal combustion engine and performs power generation; a battery which is charged by power generation electric power of the generator; and a power generation control device which reduces the amount of fuel to be consumed for power generation of the internal combustion engine. The power generation control device includes: a unit which sets an operating range that is small in the amount of fuel to be consumed for an increase in torque of the internal combustion engine; a setting unit of power generation electric power which calculates a target value of power generation current with high power generation efficiency according to rotation speed and power generation voltage of the generator, and sets electric power with high power generation efficiency to a target value of power generation electric power; and a control unit which controls so that the amount of power generation of the generator is the target value of power generation electric power when an operating point of the internal combustion engine is in the operating range.

Further, the power generation control device includes a unit which performs power generation according to the target value of power generation electric power of the generator when the generator is in a rotation speed range with high power generation efficiency.

Furthermore, according to the present invention, there is provided a power generation control method for a vehicular power generation system including: a generator which is driven by an internal combustion engine and performs power generation; a battery which is charged by power generation electric power of the generator; and a power generation control device which reduces the amount of fuel to be consumed for power generation of the internal combustion engine. The power generation control method includes: a first step which detects an operating point of the internal combustion engine based on rotation speed and torque (or an equivalent for torque); a second step which determines whether or not the detected operating point is in an operating range for performing combustion power generation, the operating range being an operating range that is small in the amount of fuel to be consumed for power generation; a third step which calculates a target value of power generation current with high power generation efficiency according to rotation speed and power generation voltage of the generator, and sets a target value of power generation electric power which operates the generator efficiently; a fourth step which determines whether or not the rotation speed of the generator is in a rotation speed range with high power generation efficiency according to the target value of power generation electric power set in the third step; a fifth step which calculates power generation current of the generator; a sixth step which sets regulating voltage based on a deviation between the target value of power generation current calculated in the third step and the power generation current calculated in the fifth step; and a seventh step which controls the amount of power generation of the generator based on the set regulating voltage.

According to a vehicular power generation system and a power generation control method for the vehicular power generation system of the present invention, a generator is made to operate at electric power with high power generation efficiency according to an operating point of the generator in an operating range of an internal combustion engine, the operating range being small in the amount of fuel to be consumed for power generation, whereby the amount of fuel consumption per electric energy of the internal combustion engine in operation can be reduced.

Furthermore, according to a vehicular power generation system and a power generation control method for the vehicular power generation system of the present invention, power generation is performed in a rotation speed range with high efficiency of a generator according to a target value of power generation electric power, whereby a change in power generation efficiency due to rotation speed of the generator is suppressed and power generation can be performed with constantly high power generation efficiency. Accordingly, the amount of fuel consumption per electric energy of an internal combustion engine in operation can be further reduced.

The foregoing and other objects, features, and advantages of the present invention will become more apparent from the following detailed description of embodiments and description shown in the accompanying drawings.

DETAILED DESCRIPTION OF THE INVENTION

Embodiment 1

Figure 1:
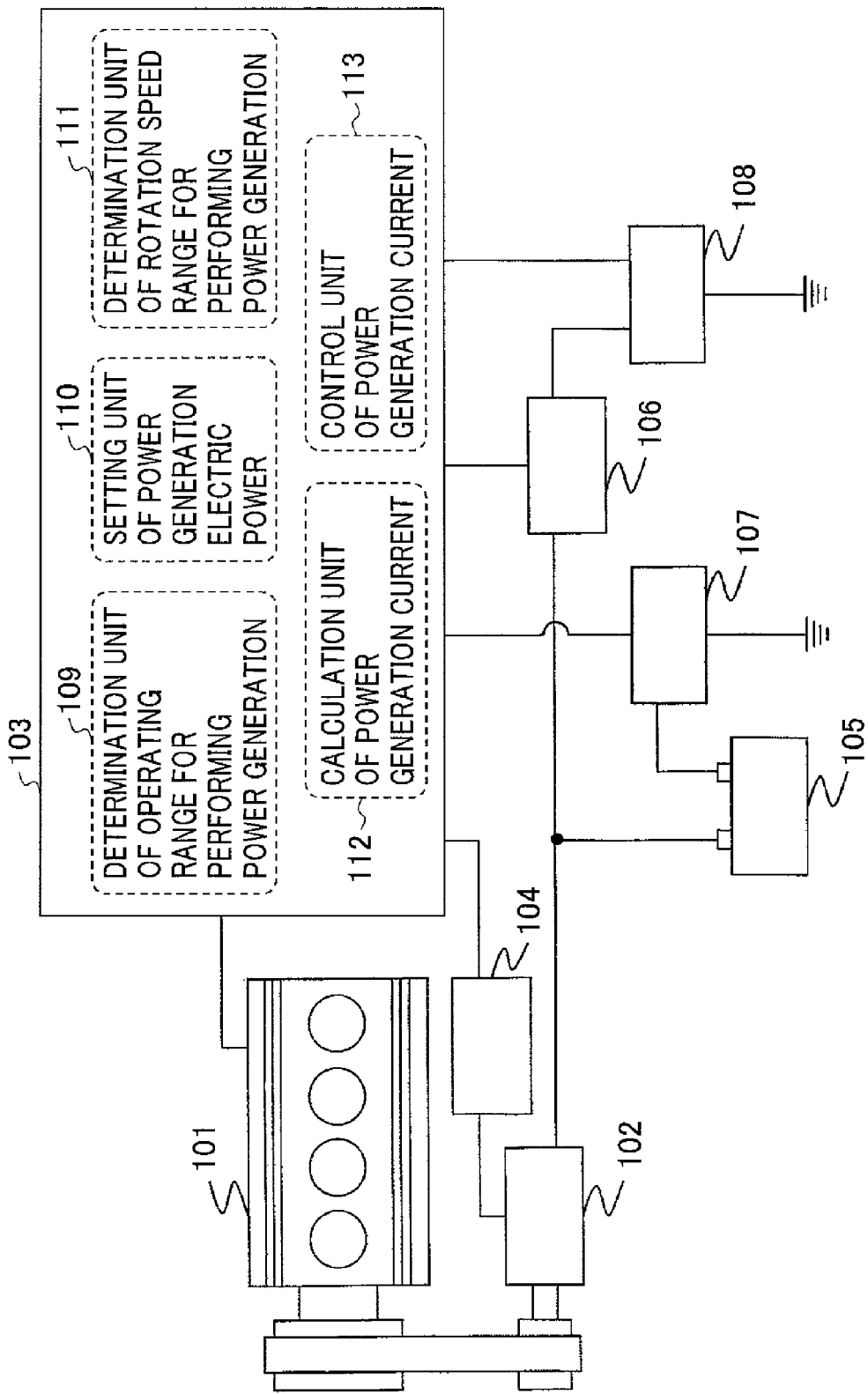
FIG. 1 is a schematic configuration diagram of an internal combustion engine in which a vehicular power generation system according to Embodiment 1 of the present invention is installed.

FIG. 1 is a schematic configuration diagram of an internal combustion engine in which a vehicular power generation system according to Embodiment 1 of the present invention is installed. In FIG. 1, an internal combustion engine 101 drives a generator 102 via a drive belt; and a power generation control device 103 controls power generation electric power of the generator 102 by operating regulating voltage of a power generation voltage regulating device 104. Incidentally, in this case, a configuration including the power generation voltage regulating device 104 is shown as a configuration with higher control accuracy. However, as an inexpensive system, the power generation control device 103 can include a unit that substitutes for the power generation voltage regulating device 104 inside thereof; and, in this case, the power generation control device 103 can directly control power generation electric power of the generator 102.

The electric power generated by the generator 102 is distributed into electric power to be charged to a battery 105 and electric power to be consumed by an electrical load 106 of a vehicle. Charging current of the battery 105 can be detected by a current sensor 107 attached to a negative electrode terminal; and, similarly, current consumed by the electrical load 106 can be detected by a current sensor 108. Power generation current of the generator 102 can be calculated by adding electrical load current of the vehicle to the charging current of the battery by a calculation unit of power generation current 112 of the power generation control device 103. Incidentally, in this case, a configuration including the current sensors 107 and 108 is shown; however, as a configuration that directly detects the power generation current of the generator 102, a current sensor may be provided between the generator 102 and a positive electrode terminal of the battery 105.

Furthermore, in the case where the current sensor 107 is not provided as an inexpensive system, if the generator 102 is an alternator, power generation current may be calculated by map calculation from rotation speed and FR duty output (an output value of the energization ratio of a field coil inside the alternator). In addition, charging current may be estimated by providing a calculation model (calculation equation or calculation block) that simulates a charging state of the battery 105, in a calculation program written in the power generation control device 103.

Furthermore, in the case where the current sensor 108 is not provided, the electrical load current of the vehicle may be calculated from rated electric power consumption of the electrical load in operation.

Figure 2:
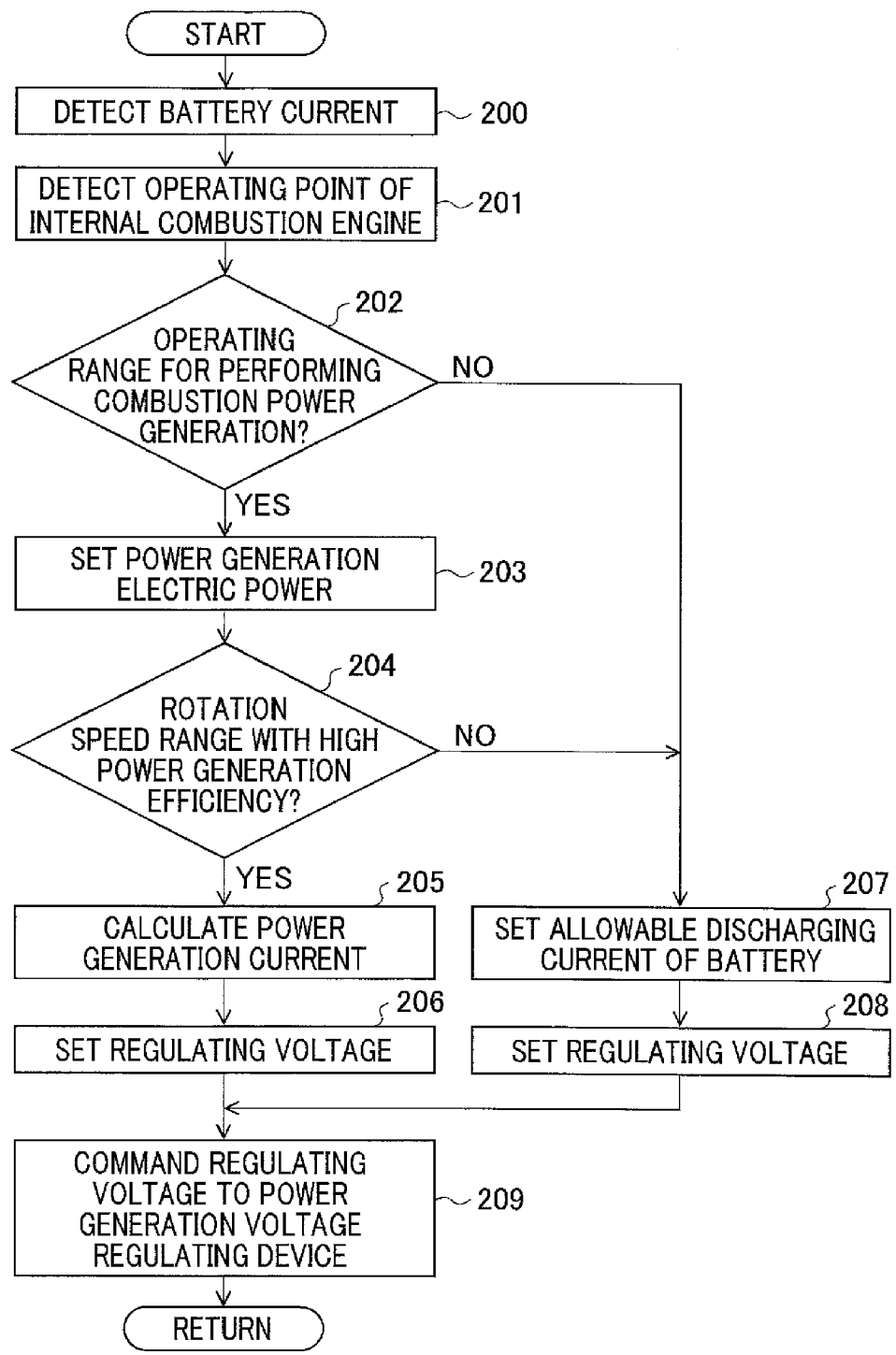
FIG. 2 is a flowchart showing a process of a power generation control device according to Embodiment 1 of the present invention.

FIG. 2 is a flowchart showing a process of the power generation control device 103 (see FIG. 1) according to Embodiment 1 and processing is executed at a predetermined calculation cycle (for example, 100 msec).

In FIG. 2, charging and discharging current of the battery is detected using the current sensor 107 attached to the negative electrode terminal of the battery 105 in step 200; and the processing proceeds to a process of step 201.

In step 201, rotation speed and torque (alternatively, intake manifold pressure or charging efficiency that substitutes for the torque) are detected as an operating point of the internal combustion engine; and the processing proceeds to a process of step 202.

In step 202, a determination is made by a determination unit of an operating range for performing power generation 109 whether or not the operating point of the internal combustion engine is in an operating range for performing combustion power generation, that is, in an operating range of the internal combustion engine, the operating range being small in the amount of fuel to be consumed for power generation (to be described in detail using FIG. 3); and if the operating point is in the operating range, the processing proceeds to a process of step 203.

Figure 5:
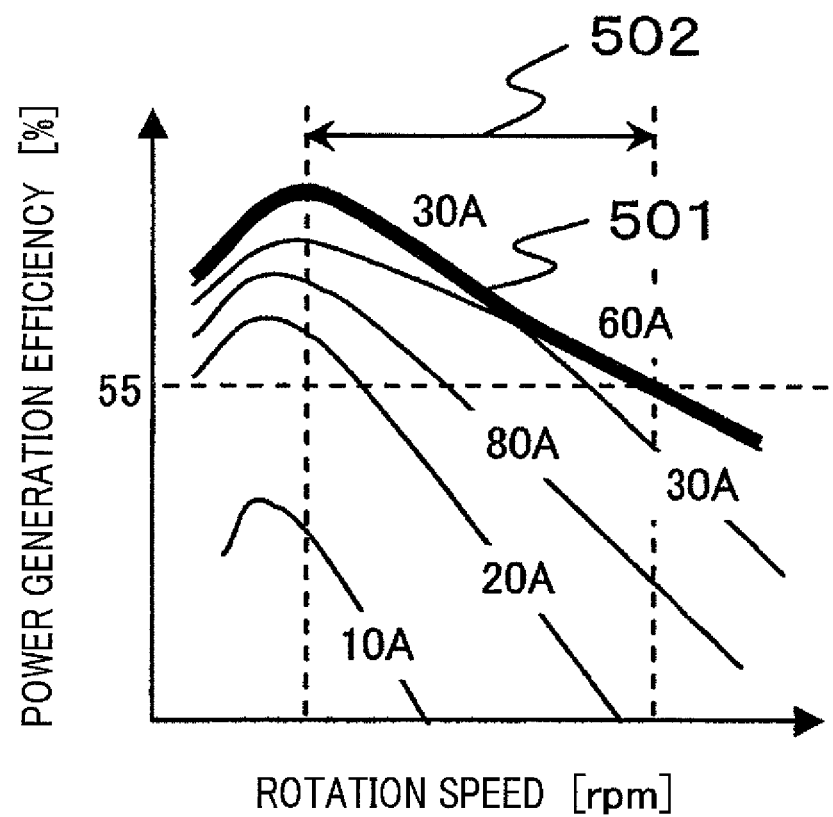
FIG. 5 is a map showing maximum efficiency of the generator according to Embodiment 1 of the present invention.

In step 203, a target value of power generation current with high power generation efficiency is calculated by map calculation by a setting unit of power generation electric power 110 according to rotation speed and power generation voltage of the generator (to be described in detail using FIG. 5). That is, power generation electric power that efficiently operates the generator is set by multiplying the power generation voltage by the target value of the power generation current. In this case, the rotation speed of the generator can be calculated by multiplying the rotation speed of the internal combustion engine by a pulley ratio; and the power generation voltage can be calculated by adding voltage drop due to resistance of wire till the generator to battery voltage.

In step 204, a determination is made by a determination unit of a rotation speed range for performing power generation 111 whether or not the rotation speed of the generator is in a rotation speed range with high power generation efficiency according to the power generation electric power set in step 203 (to be described in detail using FIG. 5); and if the rotation speed is in the rotation speed range with high power generation efficiency, the processing proceeds to a process of step 205.

In step 205, an instantaneous value of power generation current of the generator is calculated by the calculation unit of power generation current 112 by adding the electrical load current of the vehicle to the charging current of the battery 105; and the processing proceeds to a process of step 206.

In step 206, a voltage set value to be commanded to the power generation voltage regulating device 104 based on a deviation between the target value of power generation current calculated by map calculation in step 203 and the instantaneous value of power generation current calculated in step 205 is outputted by a control unit of power generation current 113; and the processing proceeds to a process of step 209.

When the operating point of the internal combustion engine is out of the operating range for performing combustion power generation in step 202, or when the rotation speed of the generator is out of the rotation speed range with high power generation efficiency in step 204, the processing proceeds to a process of step 207. In step 207, allowable discharging current is set so that the battery does not excessively discharge when the combustion power generation is not performed; and the processing proceeds to a process of step 208.

In step 208, a voltage set value to be commanded to the power generation voltage regulating device 104 based on a deviation between the allowable discharging current and the discharging current (opposite symbol of the charging current) of the battery is outputted; and the processing proceeds to a process of step 209.

Incidentally, in this case, there is shown a technique for discharging in the case where a state of charge (SOC) of the battery is in a using range; however, if the SOC exceeds this range and degrades, for example, if the battery 105 is a lead battery, it may disable starting due to degradation of discharge performance and the progress of deterioration is concerned; and therefore, the charging current of the battery is set in step 207 and accordingly the battery may be forcibly charged in the following step. The SOC of the battery may be calculated by integrating the charging and discharging current of the battery or the SOC may be directly detected by providing a battery sensor.

In step 209, the regulating voltage set in step 206 or step 208 is commanded to the power generation voltage regulating device 104 and this processing is completed.

When the combustion power generation is performed by a series of the above processes, the generator can be operated in electric power with high power generation efficiency in the operating range of the internal combustion engine, the operating range being small in the amount of fuel to be consumed for power generation. Furthermore, when the combustion power generation is not performed, the battery can be discharged within a range of the allowable current. Incidentally, in this case, only the control process on the generator side is shown. However, as for a change in driving torque of the vehicle due to the combustion power generation, it goes without saying that, a torque corresponding to the amount of power generation is compensated by a throttle opening degree and/or a change in ignition timing as a control process on the internal combustion engine side; and accordingly, a sense of discomfort of a driver can be prevented.

Figure 3:
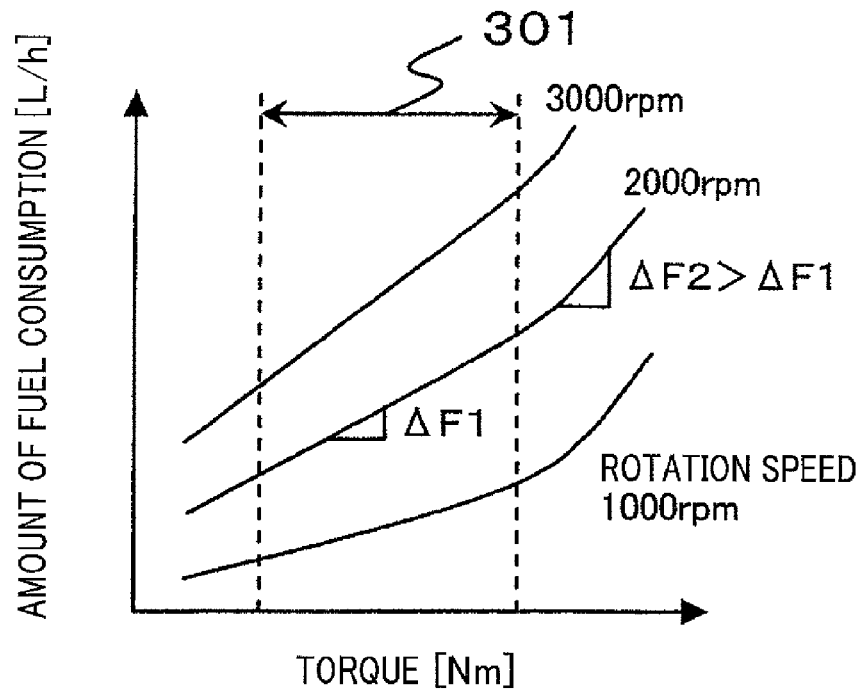
FIG. 3 is a map of the amount of fuel consumption of the internal combustion engine according to Embodiment 1 of the present invention.

FIG. 3 is a map of the amount of fuel consumption of the internal combustion engine according to Embodiment 1 of the present invention. When the internal combustion engine is a gasoline engine, there exists engine torque (Nm) in which a fuel consumption rate (L/kWh) minimizes for each rotation speed in terms of its characteristics. Therefore, in the characteristics of the amount of fuel consumption (L/h) which multiplies the fuel consumption rate (L/kWh) by engine output (kW), the engine torque (Nm) in which the fuel consumption rate (L/kWh) minimizes is served as an inflection point and the amount of fuel consumption (L/h) rapidly increases when the engine torque (Nm) exceeds the inflection point. That is, the combustion power generation should not be performed beyond this inflection point.

If an operating range that is small in increase $\Delta F(L/h)$ of the amount of fuel consumption needed for increasing unit torque (1 Nm) for each rotation speed is defined by taking account of the characteristics of the above amount of fuel consumption (L/h), its operating range is a range 301. Therefore, this operating range 301 is defined as the operating range for performing combustion power generation; and accordingly, the amount of fuel to be consumed for power generation can be suppressed small.

Figure 4:
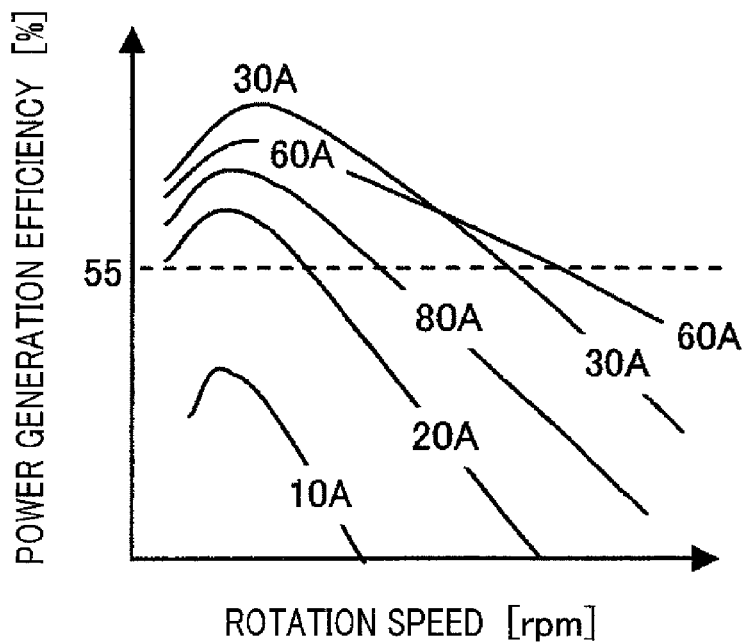
FIG. 4 is an efficiency map of a generator according to Embodiment 1 of the present invention.

FIG. 4 is an efficiency map of the generator according to Embodiment 1 of the present invention. If the generator is the alternator, and when the rotation speed increases under constant voltage and current conditions, power generation efficiency degrades with an increase in driving force needed for power generation in terms of its characteristics. The operating point that generates maximum efficiency differs due to a difference of a structure according to types thereof; and therefore, in FIG. 4 showing power generation efficiency characteristics under constant voltage conditions, the power generation efficiency maximizes at a 30 A in a low rotation range and at a 60 A in a high rotation range.

FIG. 5 is a map showing maximum efficiency of the generator according to Embodiment 1 of the present invention, and power generation efficiency maximizes at power generation electric power shown by a curve 501. Therefore, a current value on this curve is defined as a target value of power generation current according to rotation speed; and accordingly, the generator can be operated in electric power with high power generation efficiency. Furthermore, for example, if a rotation speed range in which the power generation efficiency does not degrade at a power generation efficiency of not less than 55% and in a low rotation range is defined as a rotation speed range with high power generation efficiency, its rotation speed range is a range of 502.

Therefore, power generation is performed in this rotation speed range 502; and accordingly, a change in efficiency due to the rotation speed of the generator can be suppressed within a predetermined range and the power generation can be performed with constantly high power generation efficiency.

As described above, according to Embodiment 1 of the present invention, there can be obtained the vehicular power generation system and the power generation control method for the same, which are considerably good and have the following features and operational advantages.

(1) The generator is made to operate at electric power with high power generation efficiency according to the operating point of the generator in the operating range of the internal combustion engine, the operating range being small in the amount of fuel to be consumed for power generation; and accordingly, the amount of fuel consumption per electric energy of the internal combustion engine in operation can be reduced.

(2) Power generation is performed in the rotation speed range with high efficiency of the generator according to the target value of power generation electric power; and accordingly, a change in power generation efficiency due to the rotation speed of the generator is suppressed and power generation can be performed with constantly high power generation efficiency. Accordingly, the amount of fuel consumption per electric energy of the internal combustion engine in operation can be further reduced.

(3) Power generation current of the generator is feed-backed to control the generator; and accordingly, the generator can be more accurately operated at electric power with high power generation efficiency. Accordingly, the amount of fuel consumption per electric energy of the internal combustion engine in operation can be further reduced.

(4) In place of the power generation current of the generator, charging current of the battery is feed-backed to control the generator; and accordingly, a change of a charging acceptance state of the battery can be instantaneously detected and the power generation current can be controlled. Accordingly, the amount of fuel consumption per electric energy of the internal combustion engine in operation can be further reduced without adding a power generation current detection device to the generator.

(5) Power generation current of the generator is calculated by adding charging current of the battery and electrical load consumption current of the vehicle to be feed-backed to control the generator; and accordingly, the generator can be more accurately operated at electric power with high power generation efficiency. Accordingly, the amount of fuel consumption per electric energy of the internal combustion engine in operation can be further reduced without adding the power generation current detection device to the generator.

(6) Power generation electric power is controlled via the power generation voltage regulating device; and accordingly, function for controlling the generator can be shifted from the power generation control device to the power generation voltage regulating device. Accordingly, apart of the function covered by the power generation control device can be simplified and control accuracy of the power generation electric power improves; and thus, the amount of fuel consumption per electric energy of the internal combustion engine in operation can be further reduced.

Various modifications and alternations of this invention will be apparent to those skilled in the art without departing from the scope and spirit of this invention, and it should be understood that this is not limited to the illustrative embodiments set forth herein.

What is claimed is:

1. A vehicular power generation system comprising:
    a generator which is driven by an internal combustion engine and performs power generation;
    a battery which is charged by power generation electric power of said generator; and
    a power generation control device which reduces the amount of fuel to be consumed by said internal combustion engine during power generation,
    wherein said power generation control device includes:
    a unit which sets a power generation execution operating range that is small in the amount of fuel to be consumed for an increase in torque of said internal combustion engine;
    a detection unit which detects an operating point of said internal combustion engine based on a rotation speed and one of a torque, intake manifold pressure, and a charging efficiency;
    a setting unit which calculates a target value of a power generation current with high power generation efficiency based on a rotation speed and a power generation voltage of said generator when the operating point detected by said detection unit is in the power generation execution operating range, and sets electric power generation with high power generation efficiency to a target value from the calculated target value of power generation current; and
    a control unit which controls so that a generated electric power of said generator is the target value when an operating point of said internal combustion engine is in the power, generation execution operating range, and does not execute control in which a generated electric power of said generator is the target value when the operating point of said internal combustion engine is not in the power generation execution operating range.

2. The vehicular power generation system according to claim 1,
    wherein said power generation control device includes a determination unit of a rotation speed range based on the target value of the power generation electric power of said generator when said generator is in a rotation speed range with the high power generation efficiency.

3. The vehicular power generation system according to claim 1,
    wherein said power generation control device includes a calculation unit which detects the power generation current of said generator, and
    said control unit controls so that the amount of power generation of said generator is the target value of power generation electric power by providing feedback of the power generation current of said generator when the operating point of said internal combustion engine is in the operating range.

4. The vehicular power generation system according to claim 3, further comprising:
    a first device which detects charging current of said battery; and
    a second device which detects load current to be consumed for an electrical load of said vehicle, and
    wherein said calculation unit of power generation current calculates the power generation current of said generator by adding the charging current of said battery and the load current of said vehicle, each current being detected by each said first device and said second device.

5. The vehicular power generation system according to claim 3,
    wherein, if said generator is an alternator, said calculation unit of power generation current calculates the power generation current by map calculation from rotation speed and a FR duty output of said generator.

6. The vehicular power generation system according to claim 3,
    wherein said power generation control device includes a calculation model that simulates a charging state of said battery for estimating the charging current of said battery.

7. The vehicular power generation system according to claim 3,
    wherein said calculation unit of power generation current calculates electrical load current of said vehicle from rated electric power consumption of said electrical load in operation.

8. The vehicular power generation system according to claim 3,
    wherein said control unit sets regulating voltage based on a deviation between the target value of power generation current calculated by said setting unit of power generation electric power and the power generation current calculated by said calculation unit of power generation current, and controls so that the amount of power generation of said generator is the target value of power generation electric power based on the regulating voltage.

9. The vehicular power generation system according to claim 1,
    further comprising a power generation voltage regulating device which adjusts the power generation voltage of said generator,
    said power generation voltage regulating device controlling so that the amount of power generation of said generator is the target value of power generation electric power based on the regulating voltage set by said control unit.

10. A power generation control method for a vehicular power generation system including:
    a generator which is driven by an internal combustion engine and performs power generation;

a battery which is charged by power generation electric power of said generator; and a power generation control device which reduces the amount of fuel to be consumed for power generation of said internal combustion engine, the power generation control method comprising:

a first step which detects an operating point of the internal combustion engine based on a rotation speed and one of a torque, intake manifold pressure, and a charging efficiency;

a second step which determines whether or not the detected operating point is in an operating range for performing combustion power generation, the operating range being an operating range that is small in the amount of fuel to be consumed for power generation;

a third step which calculates a target value of power generation current with high power generation efficiency according to rotation speed and power generation voltage of said generator, and sets a target value of power generation electric power;

a fourth step which determines whether or not the rotation speed of said generator is in a rotation speed range with high power generation efficiency according to the target value of power generation electric power set in the third step;

a fifth step which calculates power generation current of said generator;

a sixth step which sets regulating voltage based on a deviation between the target value of power generation current calculated in the third step and the power generation current calculated in the fifth step; and a seventh step which controls the amount of power generation of said generator based on the set regulating voltage.

11. The power generation control method for the vehicular power generation system according to claim 10, further comprising: a step which detects charging and discharging current of said battery;

a step which sets allowable discharging current of said battery; and a voltage regulating step which sets the regulating voltage based on a deviation between the allowable discharging current and discharging current of said battery, and wherein when the operating point of said internal combustion engine is out of the operating range for performing combustion power generation, or when the rotation speed of said generator is out of the rotation speed range with high power generation efficiency, the amount of power generation of said generator is controlled based on a regulating voltage value set in the voltage regulating step.

* * * * *